United States Patent [19]

Kobayashi et al.

[11] Patent Number: 5,122,828
[45] Date of Patent: Jun. 16, 1992

[54] CAMERA

[75] Inventors: Ryuichi Kobayashi, Kanagawa; Hiroyuki Kataoka, Saitama, both of Japan

[73] Assignee: Canon Kabushiki Kaisha, Tokyo, Japan

[21] Appl. No.: 636,593

[22] Filed: Jan. 2, 1991

[30] Foreign Application Priority Data

Jan. 12, 1990 [JP] Japan .............................. 2-005061

[51] Int. Cl.$^5$ .......................... G03B 15/05; G03B 1/00
[52] U.S. Cl. ..................................... 354/412; 354/413; 354/149.11; 354/173.1; 354/214
[58] Field of Search ............... 354/412, 413, 419, 126, 354/145.1, 149.11, 173.1, 173.11, 214

[56] References Cited

U.S. PATENT DOCUMENTS

| | | | |
|---|---|---|---|
| 4,449,804 | 5/1984 | Watanabe et al. ............... 354/419 X |
| 4,462,666 | 7/1984 | Orban .................................... 354/126 |
| 4,462,667 | 7/1984 | Fujii et al. ........................... 354/145.1 |
| 4,472,042 | 9/1984 | Iwata et al. ....................... 354/419 X |
| 4,970,539 | 11/1990 | Sasagaki et al. ............ 354/149.11 X |
| 4,984,005 | 1/1991 | Kazami et al. ..................... 354/412 |

Primary Examiner—W. B. Perkey
Attorney, Agent, or Firm—Robin, Blecker, Daley & Driscoll

[57] ABSTRACT

A camera has an arrangement which includes a strobe as a built-in part or to which the strobe can be detachably secured, the strobe being arranged to move to up and down positions. The camera is provided with a strobe operating device for moving the strobe from the up position to the down position, a selecting switch for selecting single shooting and continuous shooting, and a controlling arrangement. The controlling arrangement actuates the strobe operating device to move the strobe to the down position after the completion of photography when the single shooting is selected by the selecting switch. When the continuous shooting is selected by the selecting means and while the camera is continuing a photographic operation, the controlling means maintains the strobe at the up position without actuating the strobe operating means even after the completion of photography.

22 Claims, 8 Drawing Sheets

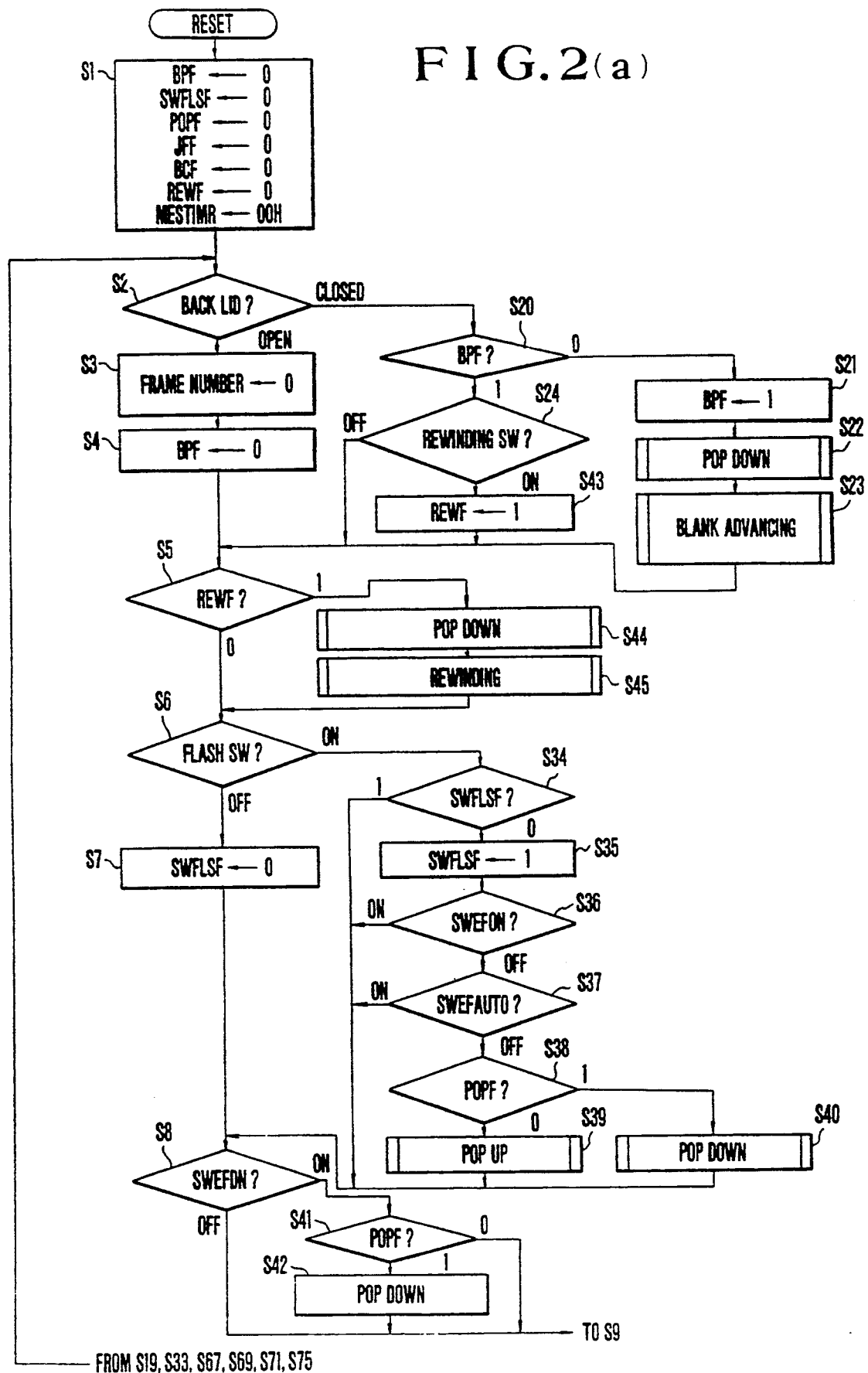

CAMERA

BACKGROUND OF THE INVENTION

1. Field of the Invention

The present invention relates to a camera of the type which includes a strobe as a built-in part or to which a strobe can be detachably secured.

2. Description of the Related Art

A camera of the type including a built-in strobe which can be manually moved up and down has conventionally been proposed. To pursue convenience, it has also been proposed to provide a camera of the type including a built-in strobe which can be automatically moved up and down when it is dark or under backlighting circumstances.

The camera of the type which permits a strobe to automatically move up and down has the following disadvantage.

In such a camera, if the strobe is popped up for photography, it is always popped down after completion of the photography. As a result, the rate of consumption of electrical power is considerably high, and some of users may also feel annoyed at such a strobe operation during continuous shooting.

Typical built-in strobe cameras are disclosed in U.S. Pat. applications Ser. No. 360,762 filed on Jun. 2, 1989, Ser. No. 375,952 filed on Jul. 6, 1989, etc.

SUMMARY OF THE INVENTION

It is, therefore, an object of the present invention to provide a camera which permits a strobe to automatically move from a pop-up position to a pop-down position and which can maintain the strobe in a pop-up state even after photography while continuous shooting is selected, whereby the rate of consumption of electrical power can be particularly reduced.

BRIEF DESCRIPTION OF THE DRAWINGS

FIGS. 2(a), 2(b), 2(c), 3, 4, 5, 6, 7 and 8 are flow charts showing the operation of the camera system.

DETAILED DESCRIPTION OF THE PREFERRED EMBODIMENT

A preferred embodiment of the present invention will be described below with reference to the accompanying drawings.

Figure 1:
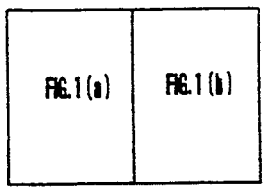
FIGS. 1, 1(a) and 1(b) are block diagrams a camera system according to an embodiment of the present invention.
Figure 1A:
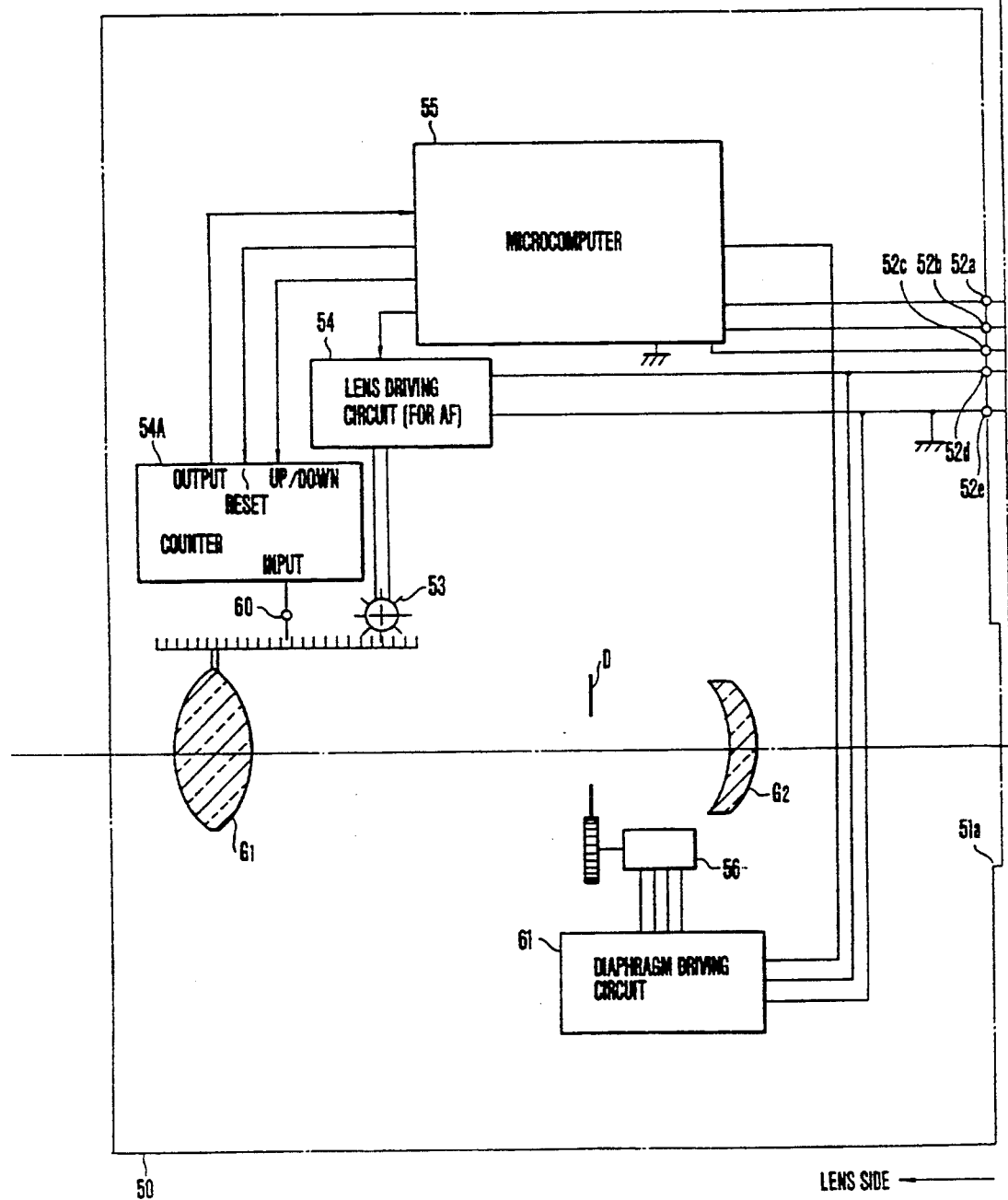
Figure 1B:
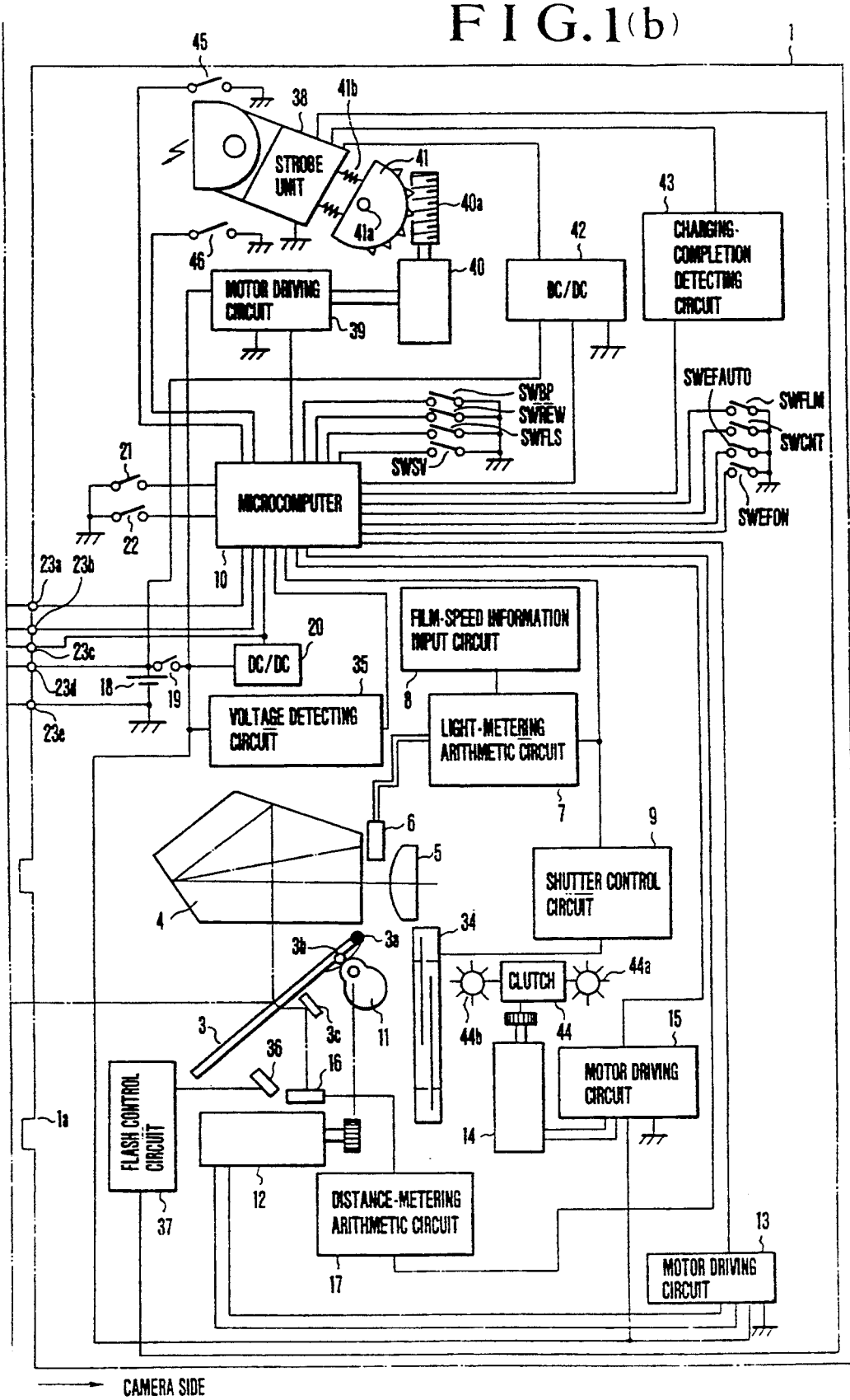

FIGS. 1, 1(a) and 1(b) are block diagrams diagrammatically showing the essential constructions of electrically operated driving arrangements and associated circuits for camera and lens bodies according to the presently preferred embodiment.

Referring to the drawings, a camera body is denoted by reference numeral 1, and an interchangeable lens body 50 is adapted to be detachably secured to the camera body 1. The camera body 1 and the interchangeable lens body 50 are coupled to each other by means of a camera-side bayonet mount 1a and a lens-side bayonet mount 51a. The camera body 1 comprises a main mirror 3, a pentagonal prism 4, an eyepiece lens 5, a light-metering photosensitive element 6, a light-metering arithmetic circuit 7, a film-speed information input circuit 8, a shutter control circuit 9 and a microcomputer 10. The light-metering arithmetic circuit 7 is connected to each of the film-speed information input circuit 8, the shutter control circuit 9 and the microcomputer 10. The camera body 1 also comprises a focal plane shutter 34, a mirror pivotal shaft 3a, an actuating pin 3b, and a mirror actuating cam 11, the actuating pin 3b being opposed to the mirror actuating cam 11. The camera body 1 also comprises a mirror driving motor 12, a motor driving circuit 13 to which the mirror driving motor 12 is connected, a film winding and rewinding motor 14, a motor driving circuit 15 to which the film winding and rewinding motor 14 is connected, and a planetary clutch 44 connected to the motor 14. When the film winding and rewinding motor 14 runs in one direction, the planetary clutch 44 transmits the rotational force to a spool actuating gear 44a, thereby effecting film winding. When the film winding and rewinding motor 14 runs in the other direction, the planetary clutch 44 transmits the rotational force to a rewinding-fork actuating gear 44b, thereby effecting film rewinding. A distance metering sensor 16 is disposed to receive light reflected from a submirror 3c, and is connected to a distance-measuring arithmetic circuit 17. The camera body 1 also comprises a battery 18 for energizing the entire camera system, a main power switch 19, and a DC/DC converter 20 connected between the battery 18 and the microcomputer 10.

The camera body 1 further comprises a light-distance metering switch 21 and a release switch 22. The switches 21 and 22 are actuated by a two-stroke switch button, and are arranged in such a manner that, when the switch button is pressed down to a first stroke position, the switch 21 is turned on, and when it is pressed down to a second stroke position, the switch 22 is turned on.

The camera body 1 further comprises a TTL film surface reflection type of flash control sensor 36 which is connected to a flash control circuit 37. The flash control circuit 37 is connected to a strobe unit 38.

A motor driving circuit 39 is arranged to drive a motor 40 which pops up and down the strobe unit 38, and is connected to the microcomputer 10. A DC/DC converter 42 is arranged to charge the main capacitor of the strobe unit 38, and is connected to the battery 18. The oscillation of the DC/DC converter 42 is ON-OFF controlled in accordance with a command sent from the microcomputer 10. A known detecting circuit 43 for detecting the completion of charging is connected to the strobe unit 38 and the microcomputer 10. A switch 45 sends a pop-up completion signal to the microcomputer 10, while a switch 46 sends a pop-down completion signal to the same.

The camera body 1 also comprises a worm gear 41 for moving up and down the strobe unit 38. The worm gear 41 is meshed with a motor output gear 40a, and pivots about a pivotal axis 41a in accordance with the switching of the running direction of the motor 40, thereby popping up and down the strobe unit 38.

An elastic member 41b, such as a spring, allows the strobe unit 38 to be manually pressed down to a slight extent (in the pop-down direction). Whether the strobe unit 38 has been pressed down is detected in accordance with the state of a switch 45, and if the switch 45 is open, this indicates that the strobe unit 38 has been pressed down.

The camera body 1 has a group of contacts 23a to 23e disposed in the vicinity of the mount plane of the camera-side bayonet mount 1a, while the lens body 50 has a group of contacts 52a to 52e. When both mounts 1a and 51a are coupled to each other, the contacts 23a to 23e are brought into contact with the contacts 52a to 52e, respectively.

The lens body 50 comprises photographic optical systems G1 and G2, a lens driving motor 53 for use in focus adjustment, a lens driving circuit 54 to which the lens driving motor 53 is connected, and a counter 54A. When the motor 53 runs, a corresponding number of pulses are inputted to the counter 54A.

The lens body 50 also comprises a diaphragm driving circuit 61 which is connected to a microcomputer 55 and a known type of pulse motor 56. A diaphragm D is driven by the motor 56.

The operation of the camera system according to the presently preferred embodiment having the above-described arrangement and construction will be described below.

When the main power switch 19 of the camera body 1 is turned on to activate the DC/DC converter 20, the DC/DC converter 20 supplies a constant operating voltage to the microcomputer 10. When a release button (not shown) is depressed to turn on the light-distance metering switch 21, the quantity of light detected by the light-metering photosensitive element 6 is transmitted to the light-metering arithmetic circuit 7, in which the quantity of metered light is memorized by a known method.

The light-distance metering switch 21 also serves as a trigger switch for initiating automatic distance metering. When the light-distance metering switch 21 is turned on, the microcomputer 10 transmits an instruction for activating the distance metering sensor 16. When the distance metering sensor 16 is activated, the distance-metering arithmetic circuit 17 performs distance-metering arithmetic operations using a known method, thereby determining the amount by which the photographic optical system G1 should be moved to an in-focus position. Then, the microcomputer 10 performs known serial communication with the microcomputer 55 disposed in the lens body 50. The microcomputer 55 sends to the lens driving circuit 54 an instruction indicative of the direction of running of the lens driving motor 53, thereby moving the photographic optical system G1 which serves as a focusing optical system. When the photographic optical system G1 is moved, the counter 54A simultaneously measures the amount of movement of the photographic optical system G1 through a ratchet 60, and the microcomputer 55 reads out the number of pulses counted by the counter 54A. In this manner, the amount by which the photographic optical system G1 has been moved is detected, and the photographic optical system G1 is made to move by the above-described amount which has been specified by the camera body 1. When the in-focus position is reached, lens driving is stopped. In general, distance metering is again performed, and if it is determined that an in-focus state is obtained, the camera body 1 provides an in-focus indication or generates an in-focus sound.

OPERATION OF STROBE

As described above, light metering is performed when the switch 21 is turned on. At this time, if a subject is dark or backlit, the motor driving circuit 39 drives the pop-up-down motor 40 in accordance with an instruction given by the microcomputer 10, thereby moving up the strobe unit 38 (pop-up operation). When the switch 45 is turned on and the completion of the pop-up operation is detected, the motor 40 is stopped. If no charging completion signal is detected at the same time, the microcomputer 10 drives the DC/DC converter 42 to charge the main capacitor of the strobe unit 38.

RELEASE SEQUENCE

Then, when the release switch 22 is turned on (when the release button is pressed down to the second stroke position), the microcomputer 10 drives the motor driving circuit 13 to activate the mirror driving motor 12, thereby rotating the mirror actuating cam 11 to force the actuating pin 3b upwardly. In this manner, the main mirror 3 is moved up (to a retreat position for photography), and is held in the retreat position.

Thereafter, known serial communication is performed between the microcomputer 10 of the camera body 1 and the microcomputer 55 of the lens body 50 through the contacts 23a, 52a; 23b, 52b, whereby the lens body 50 is instructed to select an aperture value corresponding to the quantity of metered light. If the strobe unit 38 is popped up, the lens body 50 is instructed to select an aperture value suitable for strobe photography. The set aperture value specified by the camera body 1 is supplied to the diaphragm driving circuit 61, and the diaphragm D is stopped down to the set aperture value by the pulse motor 56.

After a certain amount of time lag, the leading curtain (a leading group of blades) of the shutter 34 is made to run, thereby initiating exposure. When the duration of the shutter speed specified by the microcomputer 10 elapses, the trailing curtain (a trailing group of blades) of the shutter 34 is made to run, thereby completing exposure. If it is determined that strobe illumination is needed, the strobe unit 38 is made to emit flashlight by means of a known X contact (sync contact) upon completion of running of the leading curtain. At this time, the flash control circuit 37 performs TTL flash control utilizing light reflected by a film surface. At the instant when correct exposure is obtained, the strobe unit 38 stops emission.

The mechanical operation of the strobe unit 38 is performed as follows. If it is determined that strobe illumination is needed on the basis of the value of light metered when the switch 21 is on, the microcomputer 10 instructs the motor driving circuit 39 to activate the motor 40. When the motor 40 is activated, the worm gear 41 pivots about the pivotal axis 41a to pop up the strobe unit 38. When the detecting switch 45 is turned on and the completion of the pop-up operation is detected, the motor 40 is stopped and the strobe unit 38 exits flashlight by means of the above-described X contact.

When running of the trailing curtain is completed and one photographic cycle is completed, the mirror driving motor 12 is energized to further rotate the mirror actuating cam 22. In this manner, the main mirror 3 is moved down to a light-metering position (a position which permits observation through a viewfinder).

At the same time, the step motor 56 is reversed by the diaphragm driving circuit 61 to cause the diaphragm D to return to the original position (a position corresponding to a fully open aperture). The mirror driving motor 12 also serves to mechanically charge the Then, the microcomputer 10 outputs an activation instruction to the motor driving circuit 15, thereby carrying out film winding by means of the film winding and rewinding motor 14. In this case, the motor 14 runs in the aforesaid one direction to cause the planetary clutch 44 to drive the spool actuating gear 44a.

Thereafter, the sequence returns to its initial step for metering light and distance.

If it is determined that after film winding that the number of exposed frames has reached a prescribed number, the motor 14 is reversed to effect film rewinding. Whether film rewinding is needed is detected by a known means, for example, by utilizing information on the number of exposure frames read from the DX code of a film cartridge or by detecting the presence or absence of the stretch of a film.

If the strobe unit 38 is pressed down or forced against anything, the switch 45 is opened by the elastic member 41b. If the microcomputer 10 detects a signal indicating that the switch 45 is open, the microcomputer 10 sends an instruction to the motor driving circuit 39 to reverse the motor 40, thereby popping down the strobe unit 38. When the switch 46 is closed, the pop-down operation of the strobe unit 38 is completed. If the switch 21 is pressed in the next photographic cycle and it is then determined that a subject is dark or backlit, the strobe unit 38 is, as described above, popped up in response to an instruction sent from the microcomputer 10.

The operation of the camera system according to the present embodiment will be described below in detail with reference to the accompanying flow charts.

Figure 2B:
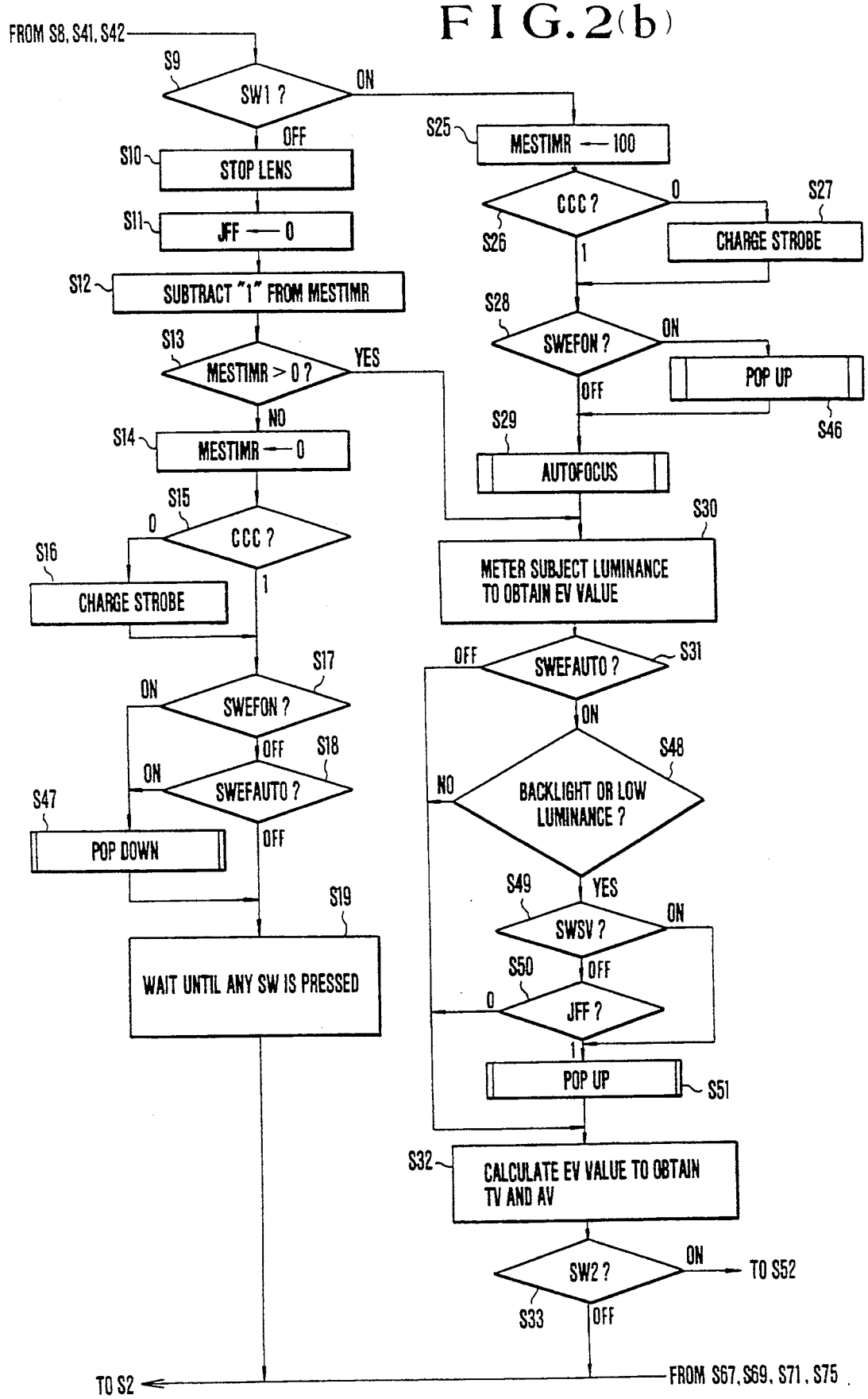
Figure 2C:
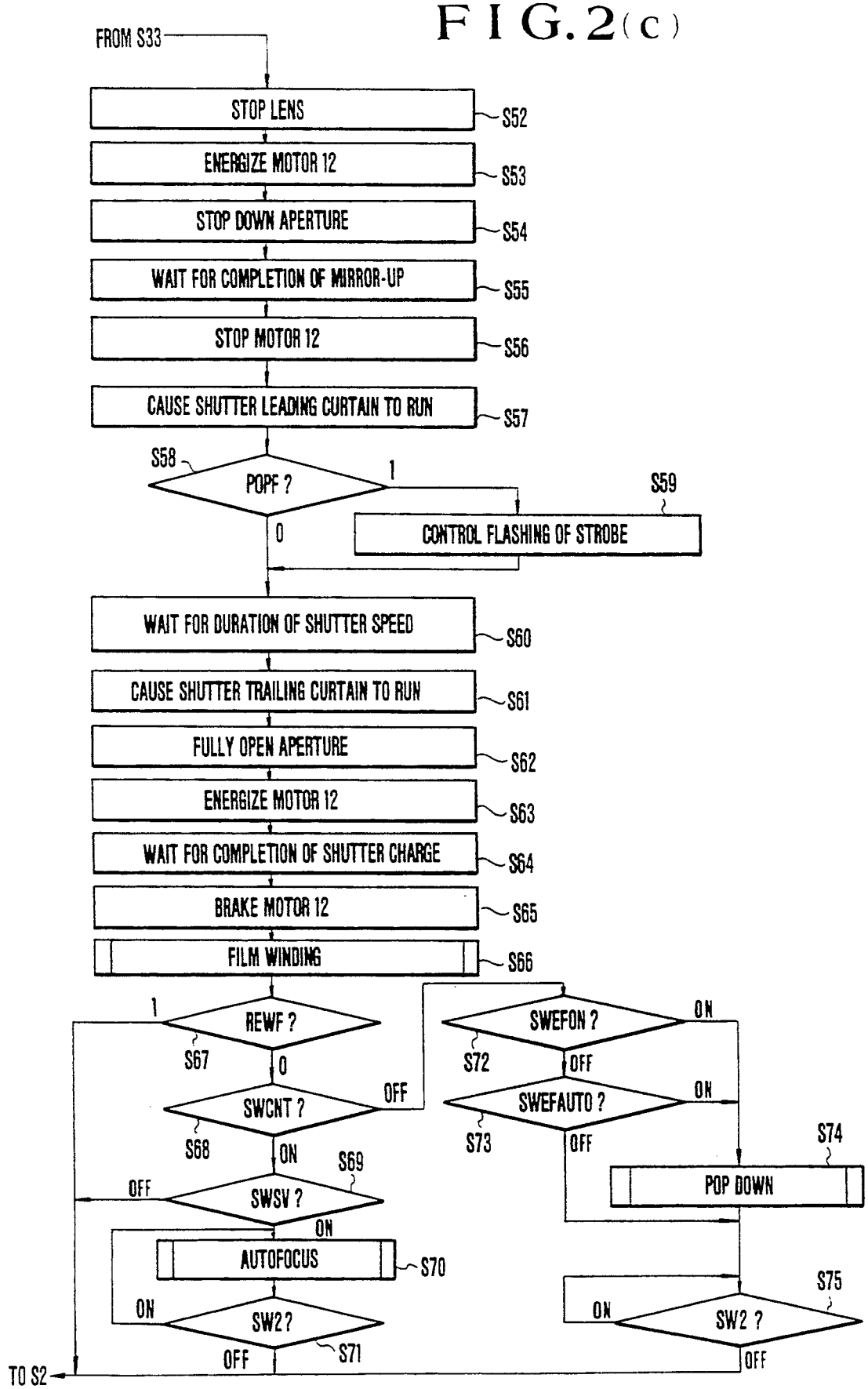

FIGS. 2(a), 2(b) and 2(c) are flow charts showing the operation of the camera system according to the present embodiment. In the following explanation of each flow chart, SWEFUP represents the switch 45 for detecting the completion of the pop-up operation of the strobe unit 38, SWEFDN represents the switch 46 for detecting the completion of the pop-down operation of the strobe unit 38, SW1 represents the light-distance metering switch 21, and SW2 represents the release switch 22.

Although not shown, the camera system further includes a number of switches which will be described below.

SWBP represents a back lid switch, SWREW a rewinding switch, SWFLS a manual pop-up switch for the strobe unit 38, SWSV a selecting switch for selecting either an autofocus servo mode or an autofocus one-shot mode, SWFLM a film operating switch interlocked with the perforations of a film, SWCNT a selecting switch for selecting either a continuous shooting mode or a single shooting mode associated with film winding, SWEFAUTO a switch for selecting the automatic flash mode of the strobe unit 38, SWEFON a switch for selecting the full-time flash mode of the strobe unit 38, and CCC the output signal of the charging-completion detecting circuit 43.

In the microcomputer 10, BPF represents a flag for memorizing the state of a back lid and "1" is assumed to indicate that the back lid is open. SWFLSF represents a flag for memorizing the state of the manual pop-up switch for the strobe unit 38. POPF represents a flag which, when set to "1", memorizes information indicating that the strobe unit 38 is popped up and, when set to "0", memorizes information indicating that it is popped down. JFF represents a flag which, when set to "1", memorizes information indicating that the autofocus system is in focus. REWF represents a flag which, when set to "1", memorizes information indicating that rewinding is needed. FRAMER represents a register for memorizing the number of frames. MESTIMR represents a light-metering timer-register, and COUNT represents a counter for filming winding.

When the main power switch 19 is turned on, the DC/DC converter 20 initiates operation and supplies electrical power to the microcomputer 10. In accordance with the supply of the electrical power, the microcomputer 10 initiates operation in its reset state. It is assumed here that the back lid is open with all the switches off.

[Step S1] The flags and registers are initialized.

[Step S2] The state of the black-lid switch SWBP is identified. If SWBP is open, the process proceeds to Step S3.

[Step S3] The number of frames is cleared.

[Step S4] The black-lid flag BPF is cleared.

[Step S5] The state of the rewind flag REWF is identified. Since REWF has been cleared in Step S1, the process proceeds to Step S6.

[Step S6] The state of the manual pop-up switch SWFLS for the strobe unit 38 is identified. If it is off, the process proceeds to Step S7.

[Step S7] The flag SWFLSF of the manual pop-up switch SWFLS is cleared.

[Step S8] The state of the strobe pop-down switch SWEFDN is identified. If it is off, the process proceeds to Step S9.

[Step S9] The state of the light-distance metering switch SW1 is identified. If it is off, the process proceeds to Step S10.

[Step S10] If the lens is in operation, it is stopped.

[Step S11] The flag JFF indicative of an in-focus state is cleared.

[Step S12] "1" is subtracted from the value of the light-metering timer-register MESTIMR.

[Step S13] The state of the light-metering timer-register MESTIMR is identified. If it is positive, the process proceeds to Step S30. Since it is now cleared to "0" in Step S1 and it is not positive, the process proceeds to Step S14.

[Step S14] The light-metering timer-register MESTIMR is cleared.

[Step S15] The state of the charging completion signal CCC, which indicates the completion of charging of the main capacitor of the strobe unit 38, is identified. If charging is not completed, the process proceeds to Step S16; otherwise, the process proceeds to Step S17.

[Step S16] The DC/DC converter 42 is activated to charge the main capacitor of the strobe unit 38. If charging is completed, the operation of the DC/DC converter 42 is stopped and the process proceeds to the next step.

[Step S17] The state of the full-time strobe flash mode switch SWEFON is identified. Since it is now off, the process proceeds to Step S18.

[Step S18] The state of the automatic strobe flash mode switch SWEFAUTO is identified. Since it is now off, the process proceeds to Step S19.

[Step S19] The process stands ready until an arbitrary switch is turned on.

In this step, if a photographer loads a film and closes the back lid, the process returns from Step S19 to Step S2. If it is assumed here that the back lid is closed, the process proceeds to Step S20.

[Step S20] The state of the back lid flag BPF is identified. Since it has been cleared to "0" in Step S4, the process proceeds to Step S21.

[Step S21] The back lid flag BPF is set to "1".

[Step S22] The subroutine POP-DOWN is called. Since the film has been loaded and the back lid has been closed, the strobe unit 38 is popped down before three blank frames of the film are advanced for autoloading purpose. Simultaneously, the strobe flag POPF is cleared.

The subroutine POP-DOWN will be described below in detail.

[Step S23] Three blank frames of the film are advanced. Upon completion of the blank advancing, the process proceeds to Step S5 (autoloading operation).

Subsequently, in Step S19, the process waits for a change to occur in the state of an arbitrary switch, as described above.

If the photographer aims the camera at a subject to be photographed and turns on the light-distance metering switch 21, the process returns from Step S19 to Step S2. Since the back lid is now closed, the process proceeds to Step S20. In Step S20, the state of the back lid flag BPF is identified. Since "1" has been set in Step S21, the process proceeds to Step S24. [Step S24] The state of the rewinding switch SWREW is identified. Since it is off, the process proceeds to Step S5. By utilizing the back lid BPF in the above-described manner, it is possible to achieve the arrangement of performing blank advancing only once when the back lid is closed.

The subsequent steps up to Step S8 have been described above.

In Step S9, the state of the light-distance metering switch 21 is identified. Since it is on, the process proceeds to Step S25.

[Step S25] "100" is set in the light-metering timer-register MESTIMR.

[Steps S26 and S27] As in Steps S15 and S16, if charging is not completed, charging is performed.

[Step S28] The state of the full-time strobe flash mode switch SWEFON is identified. Since it is now off, the process proceeds to Step S29.

[Step S29] The subroutine AUTOFOCUS is called. Although details are described later, the subroutine includes the steps of metering the distance to the subject and moving the lens (optical system G1) to an in-focus position. The distance-metering step of this subroutine is to detect the amount of defocus at the present position of the optical system G1.

[Step S30] The luminance of the subject is metered to obtain an EV value.

[Step S31] The state of the automatic strobe flash mode switch SWEFAUTO is identified. Since it is off, the process proceeds to Step S32.

[Step S32] A shutter speed and an aperture value are obtained through arithmetic operations using the EV value. The arithmetic operations are performed in accordance with a known program or a known shutter-speed or aperture-value priority operation. If the strobe flag POPF is set up, known arithmetic operations for strobe photography are performed.

[Step S33] The state of the release switch 22 (SW2) is identified, and the process proceeds to Step S2.

In this manner, while the light-distance metering switch 21 (SW1) is being pressed, light metering and distance metering are repeated. When the light-distance metering switch 21 (SW1) is turned off, the process proceeds from Step S9 to Step S10.

In Steps S10 and S11, the lens is stopped and the in-focus flag JFF is cleared, thereby completing distance metering.

Since "100" has been set in the light-metering timer-register MESTIMR in Step S25, if "1" is subtracted from the value of MESTIMR in Step S12, the value remains positive and the process proceeds to Step S30.

Accordingly, even if the light-distance metering switch 21 is off, only light metering is repeated by a predetermined metering is repeated 100 times, the value of the light-metering timer-register MESTIMR is not positive. Accordingly, the process proceeds to Step S14 and light metering is completed. In other words, after the light-distance metering switch 21 has been turned off, only light metering can be repeated for a predetermined period of time.

If the manual pop-up switch SWFLS is pressed during either light metering or a wait for the ON operation of an arbitrary switch in Step S19, the process proceeds from Step S6 to Step S34.

[Step S34] The state of the flag SWFLSF of the manual pop-up switch is identified. Since it has been set to "0" in Step S7, the process proceeds to Step S35.

[Step S35] The switch flag SWFLSF is set to "1⇌. Accordingly, each time the switch SWFLS is turned on, the process passes through Step S35 only once.

[Step S36] The state of the full-time strobe flash mode switch SWEFON is identified. Since it is now off, the process proceeds to Step S37.

[Step S37] The state of the automatic strobe flash mode switch SWEFAUTO is identified. Since it is now off, the process proceeds to Step S38.

[Step S38] The state of the strobe flag POPF is identified. Since POPF was cleared when it was popped down in Step S22, the process proceeds to Step S39. If it is popped up, the process proceeds to Step S40.

[Step S39] The strobe unit 38 is popped up and flashlight photography is enabled.

[Step S40] The strobe unit 38 is popped down and photography using stationary light is enabled.

In the above-described manner, each time the manual pop-up switch SWFLS is pressed, the strobe unit 38 is alternately popped up and down.

If the strobe unit 38 is forced down in the pop-up state, the motor 40 is reversed to pop down the strobe unit 38 and the strobe pop-down switch SWEFDN is turned on. Accordingly, the process proceeds from Step S8 to Step S41.

[Step S41] The state of the strobe unit 38 is identified. If it is popped up, the process proceeds to Step S42.

[Step S42] The strobe unit 38 is popped down.

In the above-described manner, when the photographer presses down the strobe unit 38, the strobe unit 38 can be retracted (popped down) in accordance with his intention.

If the rewinding switch SWREW is turned on with the back lid closed, the process proceeds from Step S24 to Step S43.

[Step S43] The rewind flag REWF is set to "1". Not only when the rewinding switch SWREW is turned on but also when film winding is impossible due to a film stretch which will be described later or when the number of exposed frames reaches the value specified by the DX code of the film, the rewind flag REWF is set to "1".

If the rewind flag REWF is "1", the process proceeds from Step S5 to Step S44.

[Step S44] The subroutine POP-DOWN is called. The built-in strobe unit 38 is retracted (popped down) and, at the same time, the strobe flag POPF is cleared.

[Step S45] The film is rewound. Upon completion of rewinding, the process proceeds to Step S6.

As described above, if the automatic strobe flash mode switch SWEFAUTO and the full-time strobe flash mode switch SWEFON are off, the photographer can pop up and down the strobe unit 38 by pressing the manual pop-up switch SWFLS.

The following explanation will be made in connection with the operation of the camera system when the full-time strobe flash mode switch SWEFON is on. In this operation, even if the manual pop-up switch SWFLS is turned on, the process branches to Step S8 at Step S36, so that the built in strobe unit 38 does not operate.

When the light-distance metering switch 21 is turned on, the process proceeds from Step S28 to Step S46.

[Step S46] The subroutine POP-UP is called. When the light-distance metering switch 21 is turned off and light metering is performed for a predetermined period of time, the process proceeds from Step S17 to Step S47.

[Step S47] The subroutine POP-DOWN is called. The built-in strobe unit 38 is retracted (popped down).

Accordingly, if the full-time strobe flash mode is active, whenever the light-distance metering switch 21 (SW1) is turned on, the strobe unit 38 can pop up. When the counting operation of the light-metering timer is completed, the strobe unit 38 can pop down.

The following explanation will be made in connection with the operation of the camera system when the automatic strobe flash mode switch SWEFAUTO is on (the full-time strobe flash mode switch SWEFON is off).

In this operation as well, even if the switch SWFLS is turned on, the process branches to Step S8 at Step S37, so that the built-in strobe unit 38 does not operate.

When the light-distance metering switch 21 (SW1) is turned on, the process proceeds from Step S28 to Step S29, so that the strobe unit 38 does not pop up. In Step S31, since the switch SWEFAUTO is on, the process proceeds to Step S48.

[Step S48] If the value obtained from the light metering of Step S30 indicates a backlighting or low-luminance condition, the process proceeds to Step S49.

[Step S49] If the servo-mode selecting switch SWSV is on, that is, if the autofocus system is in the servo mode, the process proceeds to Step S51.

[Step S50] When the servo-mode selecting switch SWSV is off, that is, when the autofocus system is in the one-shot mode, if the in-focus flag JFF is set to "1", the process proceeds to Step S51.

[Step S51] The subroutine POP-UP is called. When the light-distance metering switch 21 (SW1) is turned off and light metering is performed for a predetermined period of time, the process proceeds from Step S18 to Step S47. In Step S47, the subroutine POP-DOWN is called and the built-in strobe unit 38 is retracted.

Accordingly, if the automatic strobe flash mode is active, whenever it is determined that a subject is backlit or the luminance thereof is low, the strobe unit 38 pops up and, when the counting operation of the light-metering timer is completed, the strobe unit 38 pops down.

When the release switch 22 is pressed down, the process proceeds from Step S33 to Step S52, whereby the release sequence is initiated.

[Step S52] The lens (optical system G1) which is being moved by the subroutine AUTOFOCUS is stopped.

[Step S53] The motor 12 is energized and the mirror-up operation of moving up the main mirror 3 is initiated.

[Step S54] Serial communication with the lens side microcomputer 55 is performed and the diaphragm D is stopped down to the value obtained in Step S30.

[Step S55] The process waits for completion of the mirror-up operation initiated in Step S53.

[Step S56] The motor 12 is stopped.

[Step S57] The shutter leading curtain is made to run.

[Step S58] The state of the strobe flag POPF is identified. If the strobe unit 38 stands ready for emission in the pop-up state, the process proceeds to Step S59.

[Step S59] The strobe unit 38 is made to emit flashlight and the flash control circuit 37 performs TTL flash control utilizing film-surface reflection.

[Step S60] The process waits for only the duration of the shutter speed obtained in the arithmetic routine S32.

[Step S61] The shutter trailing curtain is made to run.

[Step S62] Serial communication with the lens-side microcomputer 55 is performed and the diaphragm D is fully opened.

[Step S63] The motor 12 is energized to perform mirror-down and shutter-charge operations.

[Step S64] The process waits for completion of the shutter-charge operation.

[Step S65] The motor 12 is braked.

[Step S66] The subroutine FILM WINDING is called. The film is wound by one frame.

[Step S67] rewind flag REWF is set to "1", that is, if the film has not been wound by the subroutine FILM WINDING, the process proceeds to Step S2. Subsequently, the process proceeds from Step S5 to Steps S44 and S45, where rewinding is carried out.

[Step S68] If the continuous-shooting-mode selecting switch SWCNT is off, the process proceeds to Step S72. If the continuous-shooting-mode selecting switch SWCNT is on, the process proceeds to Step S69.

[Step S69] If the AF servo mode switch SWSV is on, the process proceeds to Step S70.

[Step S70] The subroutine AUTOFOCUS is called.

[Step S71] The state of the release switch 22 (SW2) is identified. If a single-shooting and servo mode is active, autofocus is repeated until the switch 22 (SW2) is turned off.

If the single-shooting and servo mode is active, the process proceeds to Step S72.

[Step S72] If the full-time strobe flash mode switch SWEFON is on, the process proceeds to Step S74.

S73] If the automatic strobe flash mode switch SWEFAUTO is on, the process proceeds to Step S74.

[Step S74] The subroutine POP-DOWN is called. The strobe unit 38 is retracted.

[Step S75] The process waits for the release switch 22 (SW2) to be turned off. If the switch 22 (SW2) is turned off, the process returns to Step S2.

In the above-described manner, if the single-shooting mode is selected when the full-time strobe flash mode or the automatic strobe flash mode is active, the strobe unit 38 can be popped down immediately after a shutter release operation. If the continuous-shooting mode is selected, the strobe unit 38 remains popped up until the release switch 22 (SW2) is turned off.

The camera according to the present embodiment performs photographic control operation in the above-described manner.

Figure 3:
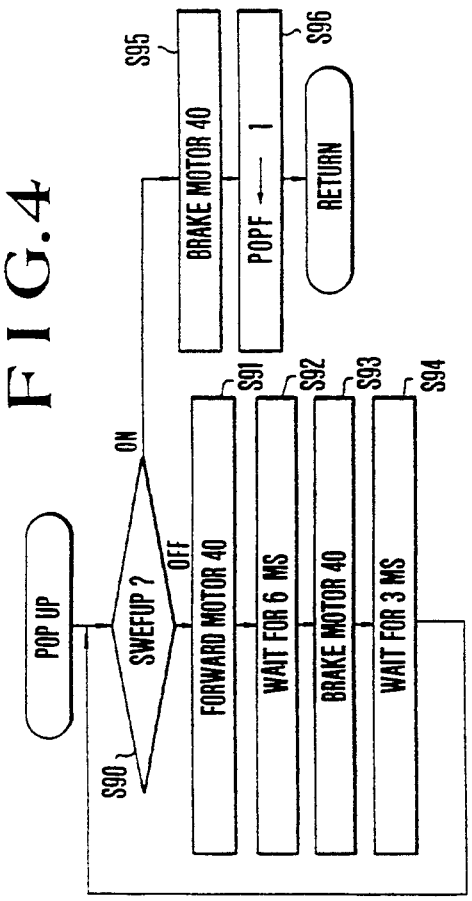

The subroutine AUTOFOCUS will be described below with reference to the flow chart of FIG. 3.

[Step S80] If the servo-mode selecting switch SWSV is on, the process proceeds to Step S81. If the one-shot mode is active, the process proceeds to Step S85.

[Step S81] Storage in the distance metering sensor 16 is initiated.

[Step S82] The amount of defocus is obtained by performing arithmetic operations on the value read from the distance metering sensor 16.

[Step S83] It is determined whether a subject is positioned within the range of focus. If it is in focus, the process proceeds to Step S86; otherwise, the process proceeds to Step S84.

[Step S84] The lens is moved to the in-focus position.

[Step S86] If the subject is in focus, the in-focus flag JFF is set to "1".

If the one-shot mode is active, the process proceeds from Step S80 to Step S85.

[Step S85] The state of the in.focus flag JFF is identified. If the flag JFF indicates an in.focus state, the process proceeds to the terminal RETURN. If the flag JFF indicates a defocus state, the process proceeds to Step S81, where the above-described autofocus operation is repeated. In other words, an autofocus operation is continued until an in-focus state is obtained, and after the in-focus state has been reached, the lens is held in the in-focus state. Since the in-focus flag JFF is not cleared before Step S11, as long as the light-distance metering switch SW1 remains pressed, the position of the lens is held.

Figure 4:
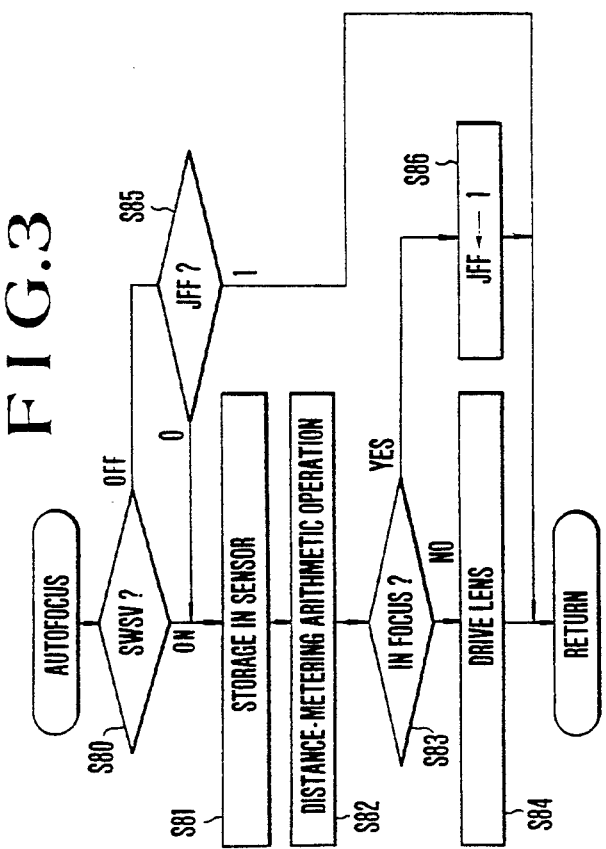

The subroutine POP-UP of FIG. 4 will be explained below.

[Step S90] A decision is made as to the state of the switch SWEFUP (SW45) for detecting the completion of a pop-up operation. If the switch SWEFUP (SW45) is on, this indicates that the strobe unit 38 is popped up. The process therefore proceeds to Step S95.

[Step S91] The motor 40 for popping up and down the strobe unit 38 is forwarded.

[Step S92] The process waits for 6 milliseconds.

[Step S93] The motor 40 for popping up and down the strobe unit 38 is braked.

[Step S94] The process waits for 3 milliseconds. Then, the process returns to Step S90. In the above-described manner, the motor 40 is intermittently energized until the stroke unit 38 completely pops up.

[Step S95] The motor 40 is braked when the strobe unit 38 is popped up.

[Step S96] The strobe flag POPF is set to "1".

Figure 5:
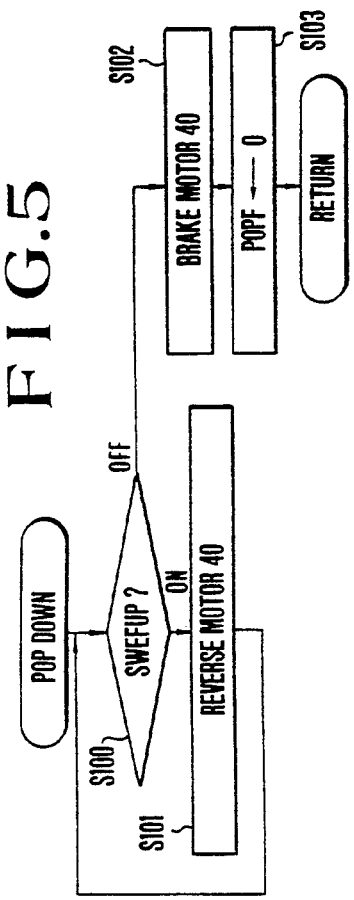

The subroutine POP-DOWN will be explained below with reference to the flow chart of FIG. 5.

[Step S100] The state of the switch SWEFUP (SW45) is identified. If it is off, this indicates that the strobe unit 38 is popped down. The process therefore proceeds to Step S102.

[Step S101] If the switch SWEFUP is on, this indicates that the strobe unit 38 is popped up. The motor is reversed until the strobe unit 38 is popped down.

[Step S102] When the strobe unit 38 has been popped down, the motor 40 is braked.

[Step S103] The strobe flag POPF is cleared.

The subroutine FILM WINDING will be explained below with reference to the flow chart of FIG. 6.

[Step S110] The number of frames read out by a DX-code reading circuit (not shown) is compared with the value of the frame-number register FRAMER. If both are equal, the process proceeds to Step S123; otherwise, the process proceeds to Step S111.

[Step S111] The film winding and rewinding motor is forwarded to rotate the spool actuating gear 44a, thereby initiating film winding.

[Step S112] The value of the count register COUNT is cleared.

[Step S113] A film-stretch timer is set to 400 milliseconds.

[Step S114] When the timer completes counting, the process proceeds to Step S123.

[Step S115] If the film operating switch SWFLM is turned on, the process returns to Step S144. If it is off, the process proceeds to Step S116.

Accordingly, if the film operating switch SWFLM is turned off with the film wound, the process proceeds to Step S116. In contrast, if the film stretches and cannot be wound and the film operating switch SWFLM remains on for 400 milliseconds, the process proceeds to Step S123.

[Step S116] The film-stretch timer is set to 400 milliseconds.

[Step S117] When the timer completes counting, the process proceeds to Step S123.

[Step S118] If the film operating switch SWFLM is turned off, the process returns to Step S117. If it is on, the process proceeds to Step S119.

As in Steps S113 to S115, it is detected whether the film operating switch SWFLM has been turned on.

[Step S119] The count register COUNT is incremented by "1".

[Step S120] If the value of the count register COUNT is "8", the process proceeds to Step S121; if it is less then "8", the process returns to Step S113. In other words, if the film operating switch SWFLM is turned on and off eight times during Steps S111 to S120, the process proceeds to Step S121.

[Step S121] Since the film has been wound by one frame, the film winding motor 14 is braked.

[Step S122] The frame-number register FRAMER is incremented by "1".

If a film stretch occurs during film winding or the number of exposed frames reaches the number of exposures specified by the DX code of the film, the process proceeds to Step S123.

[Step S123] The film winding motor 14 is braked.

[Step S124] The rewind flag REWF is set to "1" and the process proceeds to the terminal RETURN. Accordingly, since the rewind flag REWF has been set up in Step S5, film rewinding is carried out.

Figure 7:
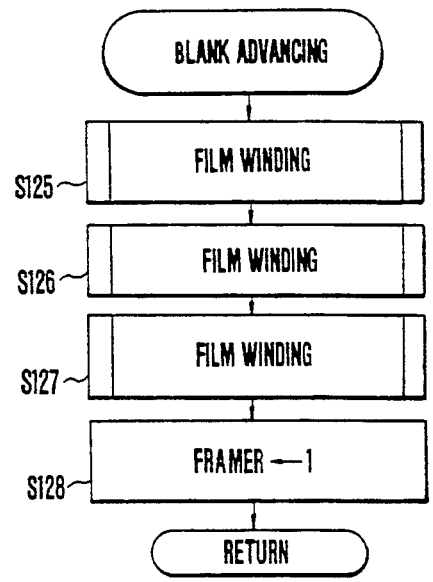

Reference is made to FIG. 7 which is a flow chart showing the operation of blank advancing of a film.

[Steps S125, S126, S127] The subroutine FILM WINDING is called three times. Three blank frames of the film are advanced.

[Step S128] "1" indicative of the first frame is set to the frame-number register FRAMER.

Figure 8:
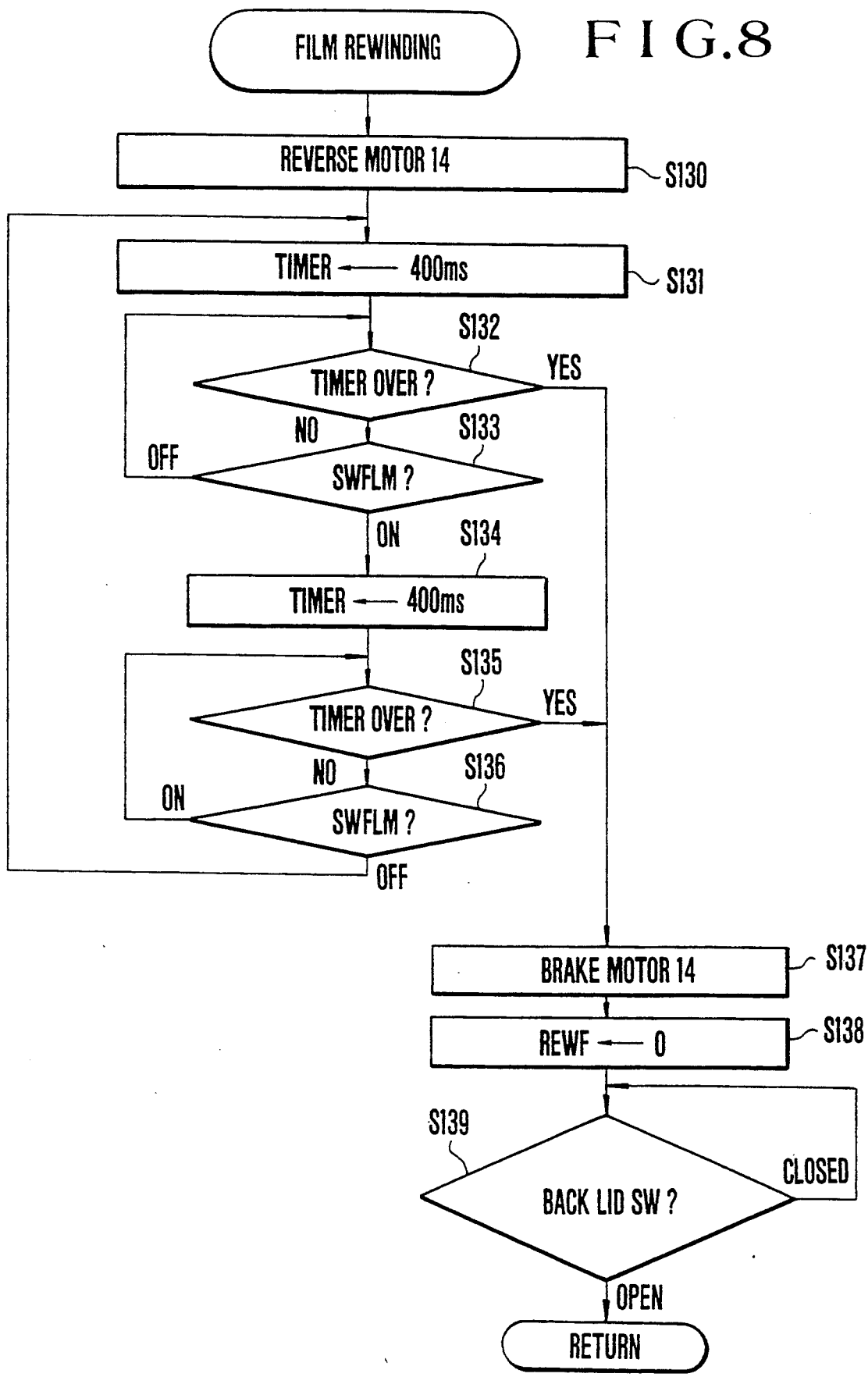

The subroutine FILM REWINDING is explained below with reference to the flow chart of FIG. 8.

[Step S130] The motor 14 is reversed to rotate the rewinding-fork actuating gear 44b, thereby initiating film rewinding.

[Step S131] The timer is set to 400 milliseconds.

[Step S132] If the timer completes counting 400 milliseconds, the process proceeds to Step S137.

[Step S133] While the film operating switch SWFLM is off, the process repeats Steps S132 and S133.

[Step S134] The time is set to 400 milliseconds.

[Step S135] If the timer completes counting 400 milliseconds, the process proceeds to Step S137.

[Step S136] While the film operating switch SWFLM is off, the process repeats Steps S135 and S136.

In other words, since the film operating switch SWFLM is turned on and off while the film is being rewound, the process repeats the loop of Steps S131 to S136. When film rewinding is completed, the film operating switch SWFLM stops the on-off operation. The timer completes counting 400 milliseconds, and the process proceeds to Step S137.

[Step S137] Since film rewinding has been completed, the motor 14 is braked.

[Step S138] The rewind flag REWF is cleared.

[Step S139] The process repeats Step S139 until the back lid is opened.

According to the presently preferred embodiment, while the continuous shooting mode is active, even if one photographic cycle is completed, the strobe unit does not pop down and remains popped up. Accordingly, as compared with an arrangement in which a strobe unit is made to pop down after the completion of each photographic cycle, it is possible to reduce power consumption and also to shorten each photographic interval (in general, frame speed).

In addition, since the strobe unit is forcedly popped down at the start of film rewinding, it is possible to prevent the strobe unit from remaining meaninglessly popped up.

Although the embodiment has been explained with reference to a strobe unit of the type which is built in a camera body, the present invention can also achieve similar advantages by adopting another arrangement. For example, a strobe unit may be employed of the type which can be detachably secured to a camera body and which is arranged to automatically pop up and down by the driving force of a motor incorporated in either the strobe unit or the camera body.

Although, in the above-described embodiment, both of the pop-up and pop-down operations of the strobe unit are effected by the driving force of a motor, at least the pop-up operation may be automatically effected by the motor or the like. In this case as well, it is possible to achieve advantages similar to those of the present invention.

What is claimed is:

1. A camera of the type which includes a strobe as a built-in part or to which said strobe can be detachably secured, said strobe being arranged to move to up and down positions, comprising:
    (a) strobe operating means for moving said strobe from said up position to said down position;
    (b) selecting means for selecting either of single shooting and continuous shooting; and
    (c) controlling means for actuating said strobe operating means to move said strobe to said down position after the completion of photography when said single shooting is selected by said selecting means, said controlling means maintaining said strobe at said up position without actuating said strobe operating means even after the completion of photography when said continuous shooting is selected by said selecting means and while said camera is continuing a photographic operation.

2. A camera according to claim 1, wherein said strobe is pivotally supported.

3. A camera according to claim 1, wherein said strobe operating means moves said strobe from said up position to said down position by using a motor as a driving source.

4. A camera according to claim 1, wherein said selecting means includes a selecting switch for selecting either of said single shooting and said continuous shooting.

5. A camera according to claim 4, wherein said single shooting includes the step of completing said photographic operation upon completion of one photographic cycle even if a release button is being operated, said continuous shooting including the step of continuously performing a plurality of photographic operations while said release button is being operated.

6. A camera according to claim 1, further comprising second strobe operating means for moving said strobe from said down position to said up position.

7. A camera according to claim 6, wherein said strobe operating means and said second strobe operating means employ one motor as a common driving source.

8. A camera according to claim 6, wherein said second strobe operating means operates in accordance with light metering information to move said strobe from said down position to said up position.

9. A camera according to claim 6, further comprising switching means for actuating said strobe operating means to initiate moving said strobe from said up position to said down position.

10. A camera according to claim 9, wherein said switching means is also capable of actuating said second strobe operating means to initiate moving said strobe from down position to said up position.

11. A camera according to claim 1, further comprising a first detecting switch for detecting the completion of movement of said strobe to said down position.

12. A camera according to claim 11, wherein said controlling means stops the operation of said strobe operating means in response to an output signal which is generated by said first detecting switch when said first detecting switch detects the completion of movement of said strobe.

13. A camera according to claim 8, further comprising a second detecting switch for detecting the completion of movement of said strobe to said up position.

14. A camera according to claim 13, wherein said second strobe operating means stops its operation in response to an output signal which is generated by said second detecting switch when said second detecting switch detects the completion of movement of said strobe.

15. A camera of the type which includes a strobe as a built-in part or to which said strobe can be detachably secured, said strobe being arranged to move to up and down positions, comprising:
    (a) stroke operating means for moving said stroke from said up position to said down position;
    (b) rewinding controlling means for controlling rewinding of a film;
    (c) position detecting means for detecting a position to which said strobe has moved; and
    (d) controlling means for actuating said strobe operating means to move said strobe to said down position when rewinding of said film is performed by said rewinding controlling means and when said position detecting means has detected that said strobe is placed in said up position.

16. A camera according to claim 15, wherein said strobe is pivotally supported.

17. A camera according to claim 15, wherein said strobe operating means moves said strobe from said up position to said down position by using a motor as a driving source.

18. A camera according to claim 15, further comprising second strobe operating means for moving said strobe from said down position to said up position.

19. A camera according to claim 18, wherein said strobe operating means and said second strobe operating means employ one motor as a common driving source.

20. A camera according to claim 18, wherein said second strobe operating means operates in accordance with light.metering information to move said strobe from said down position to said up position.

21. A camera according to claim 18, further comprising switching means for actuating said strobe operating means to initiate moving said strobe from said up position to said down position.

22. A camera according to claim 21, wherein said switching means is also capable of actuating said second strobe operating means to initiate moving said strobe from down position to said up position.

* * * * *

UNITED STATES PATENT AND TRADEMARK OFFICE
CERTIFICATE OF CORRECTION

Page 1 of 2

Figure 6:
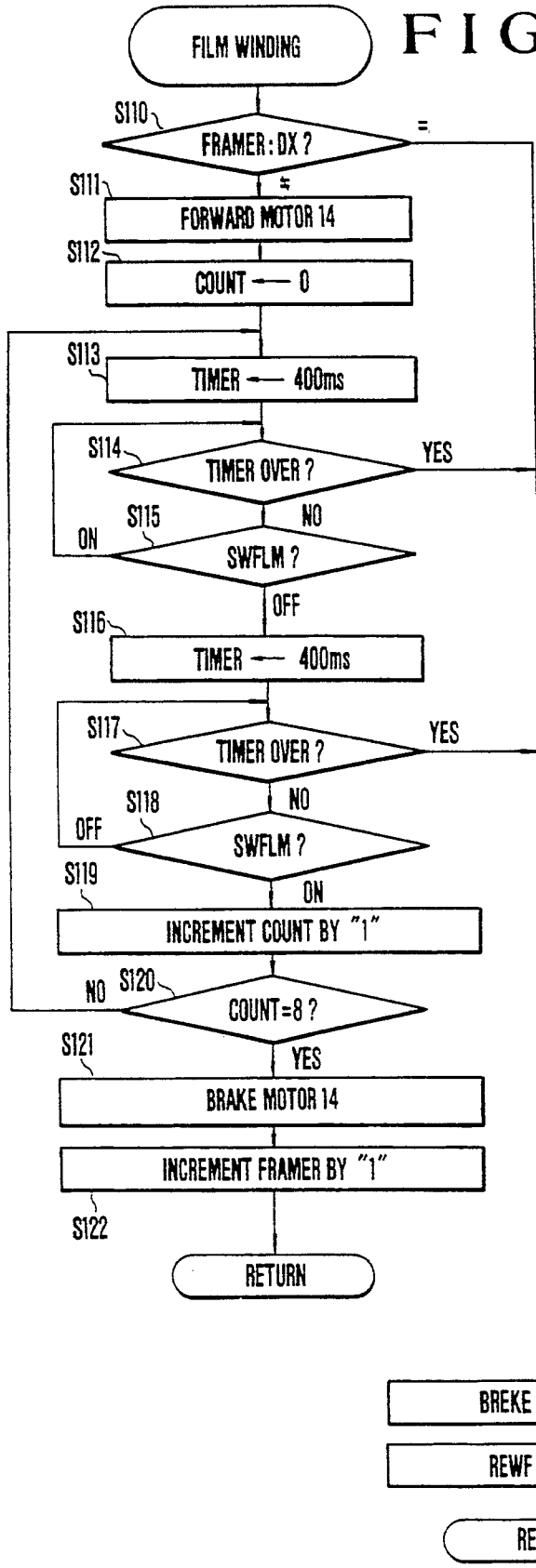

PATENT NO. : 5,122,828
DATED : June 16, 1992
INVENTOR(S) : Ryuichi Kobayashi and Hiroyuki Kataoka It is certified that error appears in the above-identified patent and that said Letters Patent is hereby corrected as shown below:

The Drawings, FIG. 6. Change "Breke" to -- Brake --
Col. 1, line 23, Delete "of"
Col. 1, line 40, After "diagrams" insert -- showing --
Col. 4, line 52, Change "exits" to -- emits --
Col. 4, line 64, After "the" insert -- focal plane shutter 34. --
Col. 6, lines 9, 13. Change "black-lid" to -- back-lid --
Col. 7, line 2, Change "purpose" to -- purposes --
Col. 8, line 3, After "predetermined" insert -- number of times (in this case, 100 times). When light --
Col. 9, line 66, Change "lens side" to -- lens-side --
Col. 10, line 24, After "[Step S67]" insert -- If the --
Col. 11, line 41, Change "stroke" to -- strobe --
Col. 11, line 64, After "motor" insert -- 14 --
Col. 12, line 61, Change "time" to -- timer --
Col. 14, line 48, Change "stroke" to -- strobe --

UNITED STATES PATENT AND TRADEMARK OFFICE
CERTIFICATE OF CORRECTION

PATENT NO. : 5,122,828
DATED : June 16, 1992
INVENTOR(S) : Ryuichi Kobayashi, et. al.

It is certified that error appears in the above-indentified patent and that said Letters Patent is hereby corrected as shown below:

Col. 15, line 8, change "light.metering" to -- light-metering --.

Signed and Sealed this

Seventeenth Day of August, 1993

Attest:

BRUCE LEHMAN

Attesting Officer  Commissioner of Patents and Trademarks